(12) United States Patent
Birnie et al.

(10) Patent No.: US 12,474,733 B2
(45) Date of Patent: Nov. 18, 2025

(54) CONFIGURABLE DISPLAY HOLDING APPARATUS AND SYSTEM

(71) Applicant: NCR Atleos Corporation, Atlanta, GA (US)

(72) Inventors: Steven James Birnie, Dundee (GB); Liam Fraser Mccafferty, Dundee (GB); Dale Caballero Rael, Minglanilla (PH); Richelle Quintano Sevilla, Loon (PH); Clarence Gale Sorrera, Cauayan (PH)

(73) Assignee: NCR Atleos Corporation, Atlanta, GA (US)

( * ) Notice: Subject to any disclaimer, the term of this patent is extended or adjusted under 35 U.S.C. 154(b) by 303 days.

(21) Appl. No.: 18/103,650

(22) Filed: Jan. 31, 2023

(65) Prior Publication Data

US 2024/0255986 A1 Aug. 1, 2024

(51) Int. Cl.
*G06F 1/16* (2006.01)
*G07G 1/00* (2006.01)

(52) U.S. Cl.
CPC ......... *G06F 1/1601* (2013.01); *G07G 1/0018* (2013.01); *G06F 2200/1614* (2013.01)

(58) Field of Classification Search
CPC .............................. G06F 1/1632; G06F 1/1637
See application file for complete search history.

(56) References Cited

U.S. PATENT DOCUMENTS

| | | | | |
|---|---|---|---|---|
| 5,629,833 A | * | 5/1997 | Ido | G06F 1/1616 361/679.01 |
| 6,189,842 B1 | * | 2/2001 | Bergeron Gull | F16M 11/24 248/283.1 |
| 6,233,139 B1 | * | 5/2001 | Hamon | F16M 11/105 361/725 |
| 6,381,125 B1 | * | 4/2002 | Mizoguchi | G06F 1/16 361/678 |
| 6,418,010 B1 | * | 7/2002 | Sawyer | G06F 1/181 361/801 |
| 6,522,529 B1 | * | 2/2003 | Huilgol | G06F 1/1683 361/679.06 |
| 7,070,156 B2 | * | 7/2006 | Liao | F16M 11/2064 248/917 |
| 7,233,488 B2 | * | 6/2007 | Liou | G09F 7/18 248/456 |
| 7,430,113 B2 | * | 9/2008 | McRight | F16M 11/105 361/679.55 |

(Continued)

FOREIGN PATENT DOCUMENTS

KR 20090027099 3/2009

*Primary Examiner* — Adrian S Wilson
(74) *Attorney, Agent, or Firm* — Schwegman Lundberg & Woessner. P.A.

(57) ABSTRACT

A display holding apparatus includes a base, a vertical member, and a bracket. The vertical member is attachable to the base in one of two different orientations to form a stand. The bracket is attachable to the vertical member of the stand in one of four different orientations. The four different bracket orientations includes a low landscape orientation, a high landscape orientation, a low portrait orientation, and a high portrait orientation. A display is attachable to the bracket in one of the four bracket orientations. In an embodiment, the base is mounted on a top surface of a transaction terminal.

8 Claims, 13 Drawing Sheets

(56) References Cited

U.S. PATENT DOCUMENTS

| | | | | |
|---|---|---|---|---|
| 7,646,593 | B2* | 1/2010 | Smejkalova | G06F 1/1681 361/679.21 |
| 7,708,240 | B2* | 5/2010 | Homer | G06F 1/1601 248/920 |
| D626,129 | S* | 10/2010 | Lutz | D14/447 |
| 7,845,605 | B2* | 12/2010 | Burge | H04R 1/025 248/220.21 |
| D643,842 | S* | 8/2011 | Marshall | D14/315 |
| D650,783 | S* | 12/2011 | Ausfeld | D14/374 |
| D650,784 | S* | 12/2011 | Feldstein | D14/434 |
| 8,172,186 | B2* | 5/2012 | Tsai | F16M 11/22 361/679.22 |
| 8,230,992 | B2* | 7/2012 | Law | G06F 1/1632 248/176.1 |
| 8,596,599 | B1* | 12/2013 | Carson | F16M 11/2085 248/920 |
| 8,619,416 | B2* | 12/2013 | Lim | G06F 1/1632 361/679.55 |
| 8,640,868 | B2* | 2/2014 | O'Dowd | H04M 1/185 455/575.8 |
| 8,749,963 | B2* | 6/2014 | Staats | G06F 1/1616 248/346.03 |
| 9,010,699 | B2* | 4/2015 | Anderson | F16M 13/02 361/825 |
| 9,292,043 | B2* | 3/2016 | Drew | F16M 11/2021 |
| 9,570,925 | B2* | 2/2017 | Rautiainen | H04M 1/04 |
| 9,713,272 | B2* | 7/2017 | Kim | G02F 1/133308 |
| 10,198,035 | B2* | 2/2019 | Wylie | G06F 1/1632 |
| 10,231,349 | B2* | 3/2019 | Kim | G06F 1/1656 |
| 10,540,857 | B1* | 1/2020 | Day | G07G 1/0045 |
| D882,570 | S* | 4/2020 | Germe | D14/375 |
| 10,754,381 | B2* | 8/2020 | Schatz | G06F 1/1632 |
| 10,863,834 | B2* | 12/2020 | Day | G07G 1/0081 |
| D1,029,836 | S* | 6/2024 | Birnie | D14/307 |
| 2002/0172336 | A1* | 11/2002 | Postma | H04M 3/533 455/344 |
| 2004/0118987 | A1* | 6/2004 | Matko | F16M 11/10 248/282.1 |
| 2005/0051693 | A1* | 3/2005 | Chu | F16M 11/2021 248/371 |
| 2005/0270732 | A1* | 12/2005 | Titzler | G06F 1/16 248/920 |
| 2006/0007644 | A1* | 1/2006 | Huilgol | G06F 1/1616 248/917 |
| 2006/0022097 | A1* | 2/2006 | Homer | G06F 1/1601 248/150 |
| 2006/0117623 | A1* | 6/2006 | Watanabe | F16M 11/16 40/606.15 |
| 2006/0143932 | A1* | 7/2006 | Chung | H04N 9/3185 33/333 |
| 2006/0145046 | A1* | 7/2006 | Liou | A47G 1/143 248/455 |
| 2006/0168865 | A1* | 8/2006 | Watanabe | F16M 13/02 40/745 |
| 2006/0171044 | A1* | 8/2006 | Carnevali | G02B 25/005 359/802 |
| 2007/0146981 | A1* | 6/2007 | Titzler | G06F 1/16 361/679.22 |
| 2007/0194191 | A1* | 8/2007 | Persson | F16M 13/02 248/225.11 |
| 2007/0258196 | A1* | 11/2007 | Koskinen | F16M 13/027 361/679.01 |
| 2008/0218952 | A1* | 9/2008 | Benn | H04N 5/64 361/679.05 |
| 2008/0259551 | A1* | 10/2008 | Gavenda | G06F 1/1656 361/728 |
| 2009/0230263 | A1* | 9/2009 | Burge | H04R 1/025 248/220.1 |
| 2010/0309615 | A1* | 12/2010 | Grey | H05K 7/14 361/679.01 |
| 2010/0321869 | A1* | 12/2010 | Fujikawa | F16M 11/24 361/679.01 |
| 2011/0011996 | A1* | 1/2011 | Cheng | F16M 13/02 248/216.4 |
| 2011/0012001 | A1* | 1/2011 | Cheng | F16M 13/02 248/294.1 |
| 2011/0037739 | A1* | 2/2011 | Burge | H04N 5/642 345/204 |
| 2011/0205032 | A1 | 8/2011 | Sekino | |
| 2011/0222238 | A1* | 9/2011 | Staats | G06F 1/1632 361/679.55 |
| 2011/0267757 | A1* | 11/2011 | Probst | G06F 1/1616 361/679.09 |
| 2012/0106059 | A1* | 5/2012 | Probst | G06F 1/1681 29/434 |
| 2012/0262866 | A1* | 10/2012 | Marshall | F16M 11/105 361/679.08 |
| 2013/0092811 | A1* | 4/2013 | Funk | G06F 1/1632 248/371 |
| 2013/0180879 | A1* | 7/2013 | O'Dowd | G06F 1/1628 206/521 |
| 2014/0098478 | A1* | 4/2014 | Gallagher | A45C 11/00 361/679.02 |
| 2014/0246354 | A1* | 9/2014 | Probst | G06F 1/181 206/756 |
| 2014/0285962 | A1* | 9/2014 | Staats | G06F 1/1616 361/679.43 |
| 2015/0076308 | A1* | 3/2015 | Hung | F16M 11/046 248/407 |
| 2017/0220076 | A1* | 8/2017 | Gerbus | G06F 1/1632 |
| 2020/0000249 | A1* | 1/2020 | Day | G06Q 20/208 |

* cited by examiner

CONFIGURABLE DISPLAY HOLDING APPARATUS AND SYSTEM

BACKGROUND

Displays and/or illuminated signs come in all a variety of different shapes, sizes, and capabilities. Displays/signs are also popular for advertisements or for drawing a customer's attention to another device, such as an automated teller machine (ATM). Any a sign/display affixed to a top surface of an ATM is often referred to as a "topper."

Current designs of ATM toppers are bulky, heavy, and inflexible. There exists just a few design options and each option is restricted to a designated position and orientation on the top surface of the ATM. Existing toppers are also time consuming to assemble and are usually shipped to a retail site separately from the ATM.

SUMMARY

In various embodiments, a configurable display holding apparatus and system are presented. The apparatus includes a base, a vertical member, and a bracket. The vertical member is attached to the base to form a stand. The bracket attaches to the vertical member of the stand in a plurality of orientations. A display attaches to the bracket in the bracket's configured orientation with the vertical member of the stand.

DETAILED DESCRIPTION

As stated above, most transaction terminals, such as ATMs, include a topper affixed to a top surface of the ATMs for purposes of providing customer advertisements to customers passing by and/or for purposes of enticing customers to perform transactions on the ATMs. In most cases, these toppers are just lighted signs with fixed and rigid designs attached to the top surface of the ATMs. The dimensions, orientations, and position of the toppers on the ATM are not configurable. More often than not, the retailer selects a topper design and then has a sign panel custom made in the size and dimensions supported by the topper design; a light behind or in the panel provides the retailer's advertisement. Consequently, many toppers appear out of place with the overall aesthetic design of the ATM or the surroundings of where the ATM is located.

Customers frequent transaction terminals to perform transactions, such as to purchase an item, withdraw currency, deposit currency, place an order with a retailer, review a status of an order, make a reservation, check-in to an establishment, etc. Accordingly, the attention of a customer is captured during a transaction at a terminal. This makes for prime real estate for retailers to pitch their products and services or to establish a retailer's brand with the customer. Additionally, displays of the terminals are often intentionally obfuscated to passers-by so that a customer performing a transaction has privacy; thus, the space above the terminal display can also be used to attract a customer to the terminal for a transaction.

The teachings provided address these issues by providing a configurable display holder apparatus and system. The apparatus can be configured to hold a lighted panel display or an intelligent display in eight different configurations, four for portrait display orientation and four for landscape display orientation. The apparatus includes a minimal amount of components and can be assembled in minutes. Moreover, the apparatus can be reconfigured for a different display orientation from an existing display orientation in minutes. The components of the apparatus are less than existing components of existing industry toppers; weigh less resulting in reduced shipping expenses; and can be setup and/or reconfigured without any skilled technician in minutes.

As used herein a "topper" is a device that includes panels which are lighted to produce a visual branding or advertisement on top of a transaction terminal. A "transaction terminal" is a self-service terminal (SST), an automated teller machine (ATM), or a kiosk. A "display" can include a topper with lighted panels to visually convey a message or a branding, a monitor, a digital sign, or an independent processing device integrated into the monitor (e.g., a tablet, touch-based monitor, smart/intelligent monitor/display, etc.).

Figure 1:
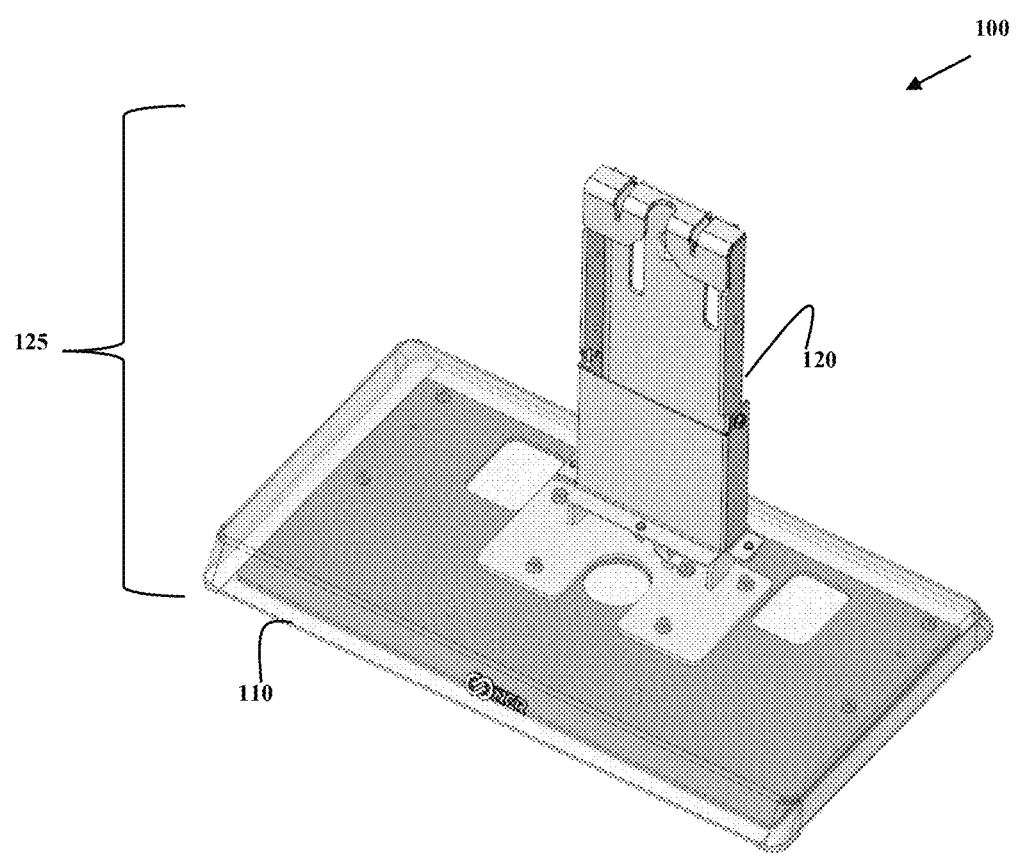
FIG. 1 is a diagram of a stand for a display holding apparatus configured in a back orientation, according to an example embodiment.
Figure 2:
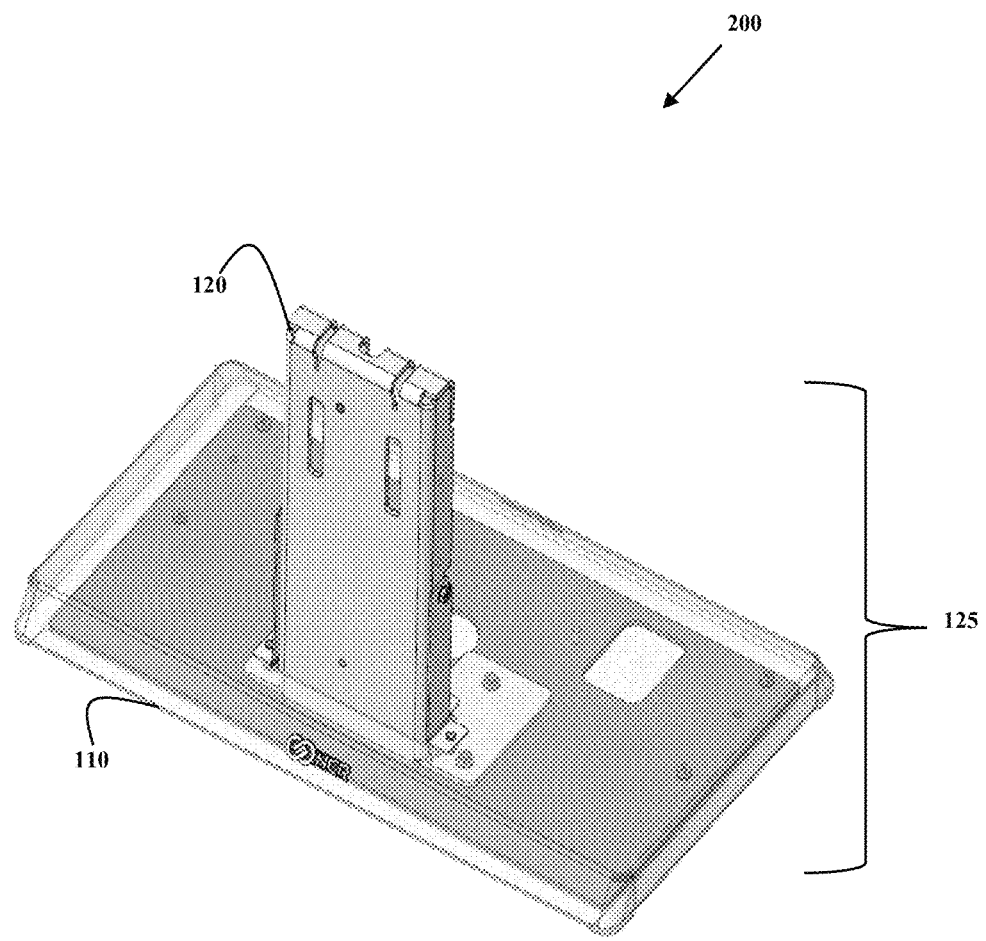
FIG. 2 is a diagram of the stand for a display holding apparatus configured in a front orientation, according to an example embodiment.
Figure 3:
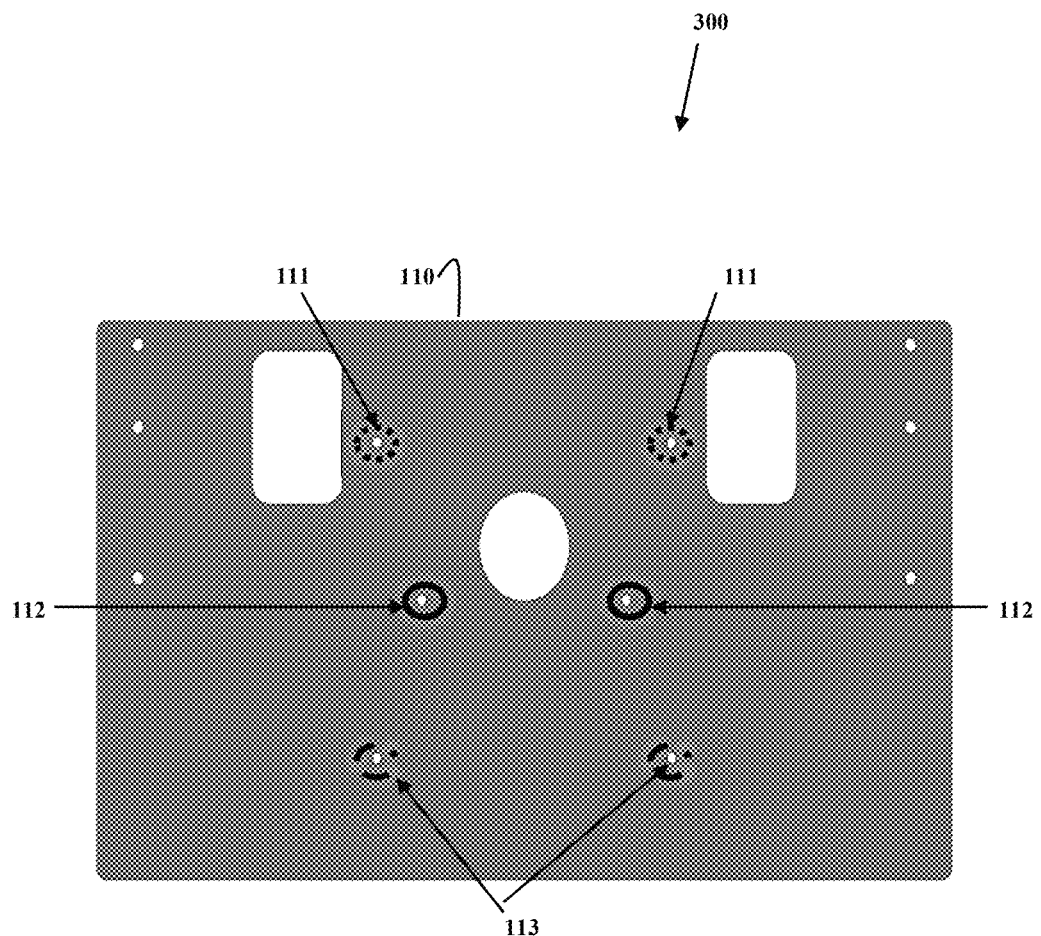
FIG. 3 is a diagram of a base for the stand of the display holding apparatus, according to an example embodiment.

The display apparatus 160 (shown in FIG. 10 below) includes a stand 125 (shown in FIG. 1 below), a bracket 130, a bracket and display cover 140 (shown in FIG. 10 below), and optionally a display 200 (shown in FIG. 10 below). FIG. 1 is a diagram 100 of a stand 125 of a display holding apparatus 160 configured in a back orientation, according to an example embodiment. FIG. 2 is a diagram 200 of the stand 125 of a display holding apparatus 160 configured in a front orientation, according to an example embodiment. FIG. 3 is a diagram 300 of a base 110 for the stand 125 of the display holding apparatus 160, according to an example embodiment.

The base 110 includes six premanufactured screw holes or apertures 111, 112, and 113. The back orientation shown in FIG. 1 utilizes screw holes 111 and 112 for purposes of securing a vertical member 120 to the base 110 to form the stand 125. The front orientation shown in FIG. 2 utilizes screw holes 112 and 113 for purposes of securing vertical member 120 to base 110 to form the stand 135. The vertical member 120 attaches to the base 110 at a right angle to the base 110. Screw holes 112 are common to both the back and front orientations of the stand 125. Corresponding screw holes 121 are shown at the bottom of vertical member 120 in FIG. 5 below.

The four screw holes 121 of vertical member 120 only align with four of the six screw holes 111, 112, and 113. The ensures that during setup the vertical member 120 can be easily aligned with base 110 and mounted via 4 screws as stand 125 to a top surface of a terminal. The four aligned screw holes 121 form a back orientation when aligned to 111 and 112 of base 110. A back orientation is one in which the vertical member 120 sits father away from the front-edge of the terminal. The four aligned screw holes 121 form a front orientation when aligned to 112 and 113 of base 110. The front orientation is one in which the vertical member 120 sits closer to the front-edge of the terminal.

Figure 4:
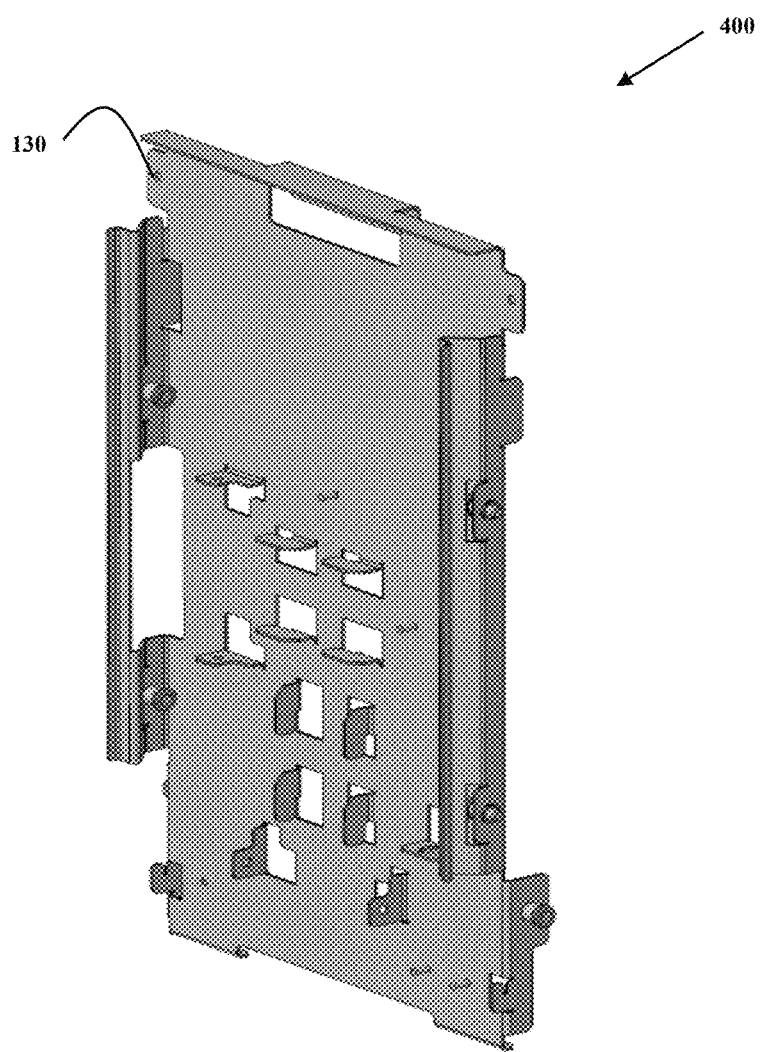
FIG. 4 is a diagram of a configurable bracket for attaching to the stand of the display holding apparatus, according to an example embodiment.
Figure 5:
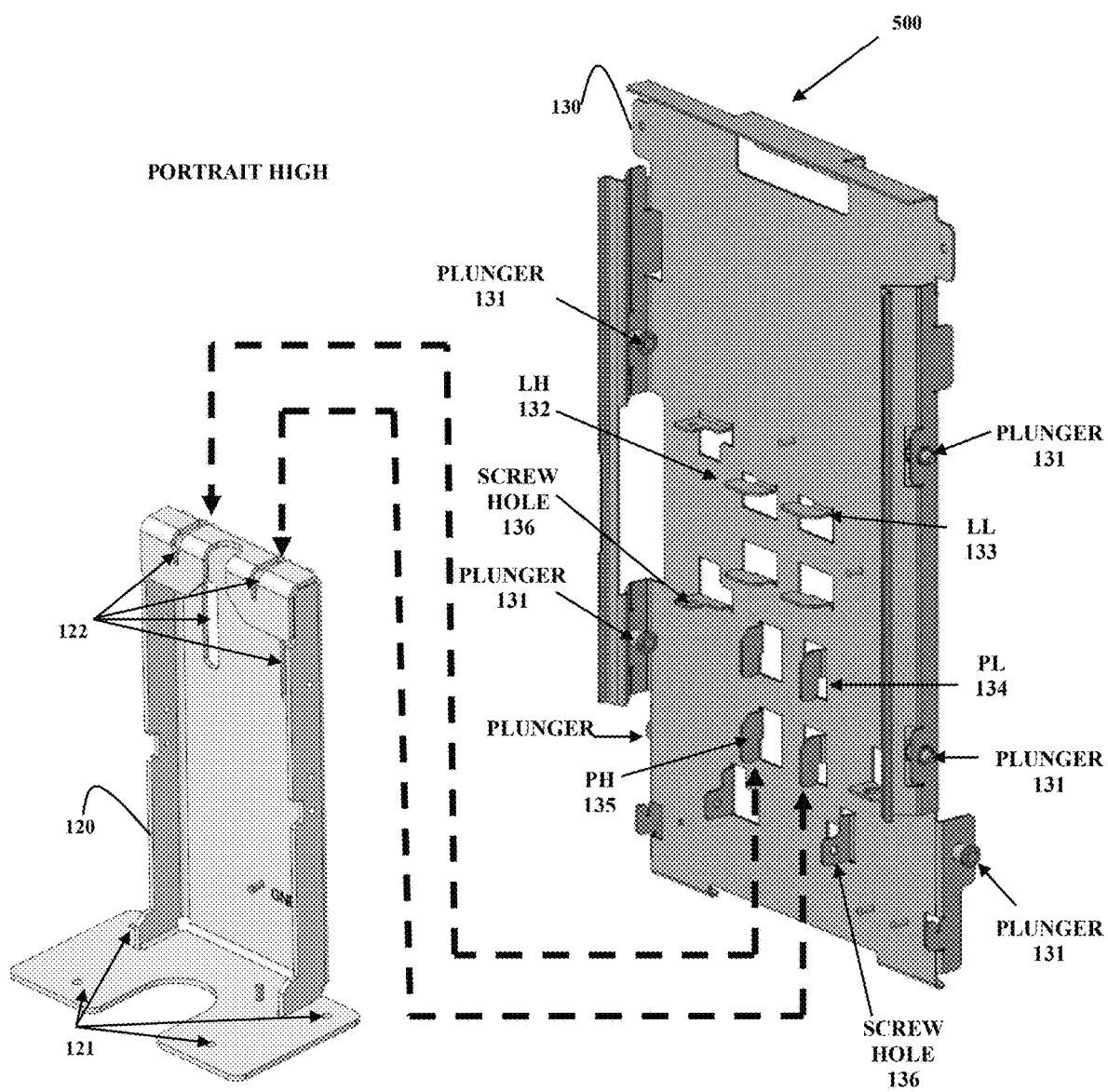
FIG. 5 is a diagram illustrating the attachment members of the configurable bracket to attach the bracket to the stand for a display in a high portrait orientation, according to an example embodiment.
Figure 6:
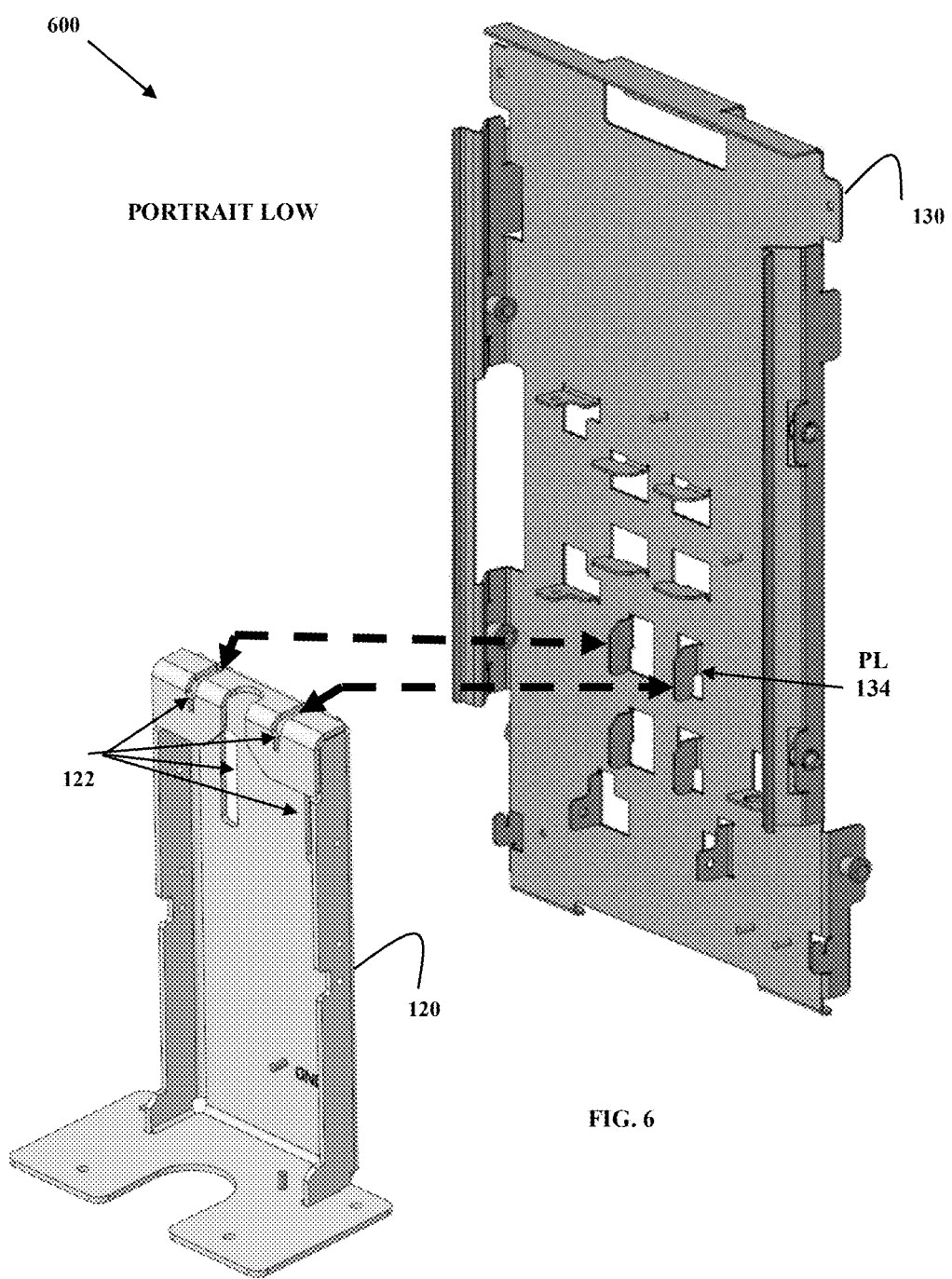
FIG. 6 is a diagram illustrating the attachment members of the configurable bracket to attach the bracket to the stand for a display in a low portrait orientation, according to an example embodiment.
Figure 7:
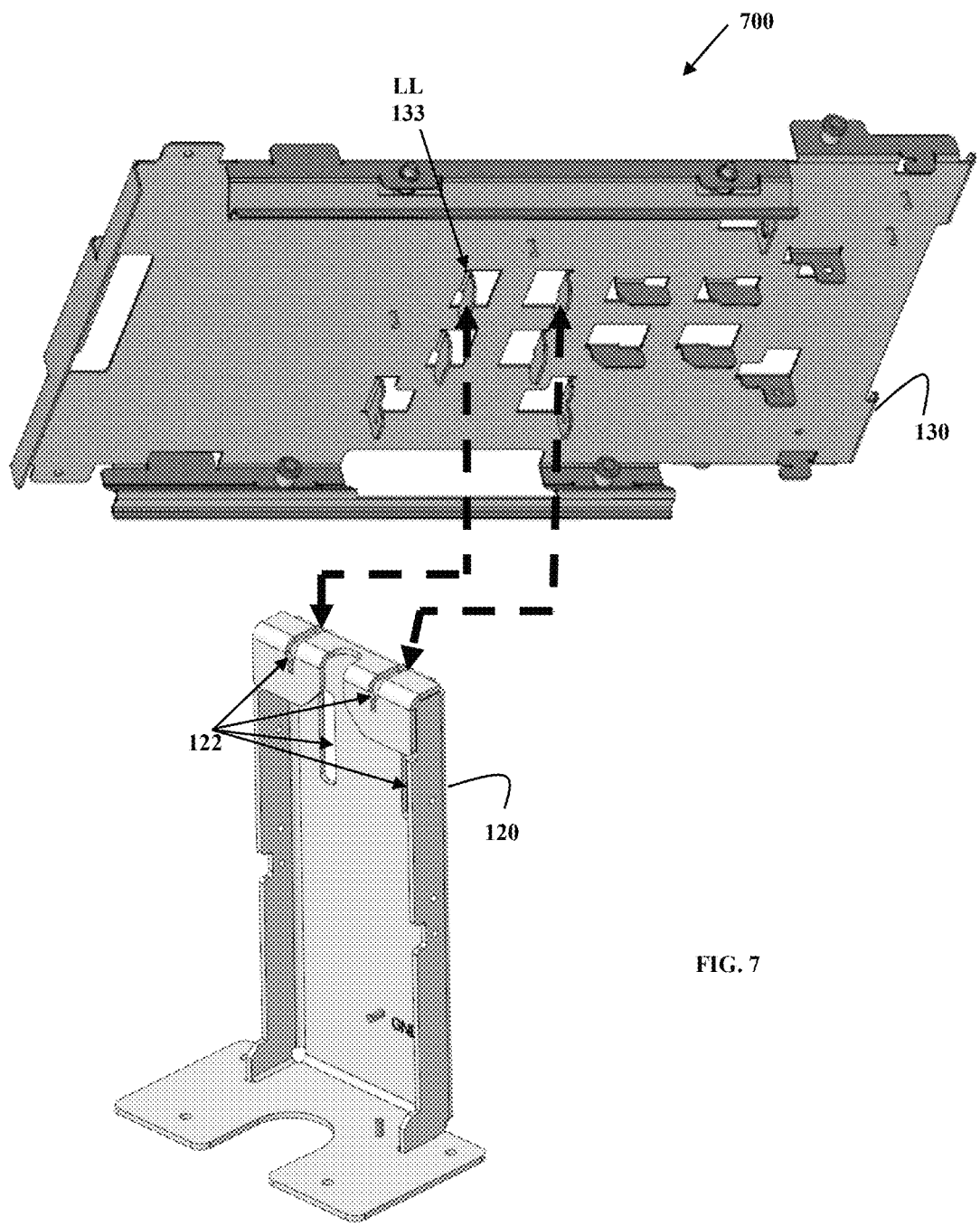
FIG. 7 is a diagram illustrating the attachment members of the configurable bracket to attach the bracket to the stand for a display in a low landscape orientation, according to an example embodiment.
Figure 8:
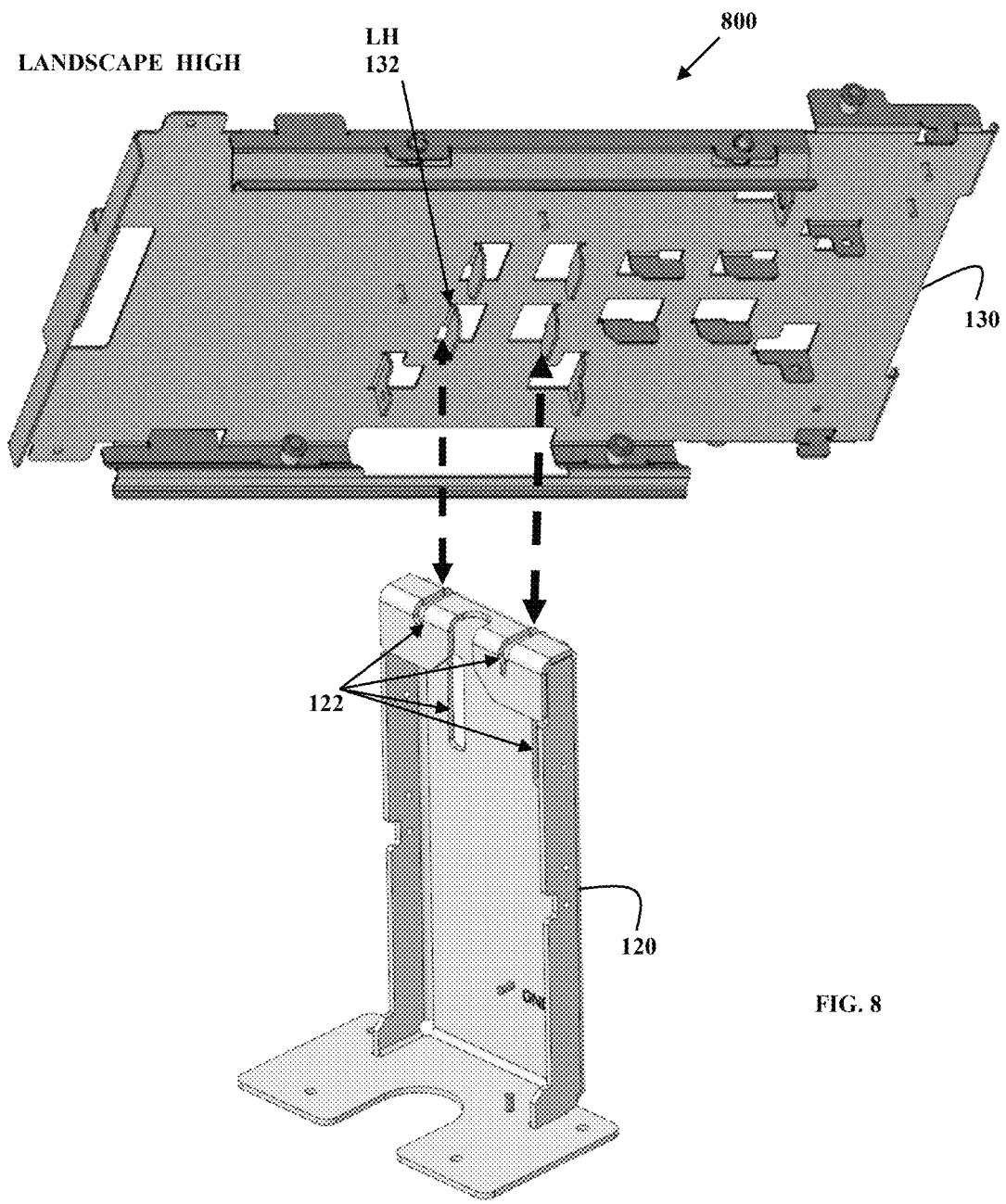
FIG. 8 is a diagram illustrating the attachment members of the configurable bracket to attach the bracket to the stand for a display in a high landscape orientation, according to an example embodiment.

FIG. 4 is a diagram 400 of a configurable bracket 130 for attaching to the stand of 125 the display holding apparatus 160, according to an example embodiment. Bracket 130 includes a plurality of manufactured tabs and screw holes for affixing the bracket 130 to stand 120 and movable plugs for affixing a display 200 (shown in FIG. 10 below). Bracket 130 can be configured to orient an attached display in four different orientations: a low portrait orientation (shown in FIGS. 6 and 9 below), a high portrait orientation (shown in FIGS. 5 and 9 below), a low landscape orientation (shown in FIGS. 7 and 9 below), and a high landscape orientation (shown in FIGS. 8 and 9 below). The bracket 130 adapted to attach to the vertical member 120 in parallel with the orientation of the vertical member 120 or at a right angle to the vertical member 120. The in parallel attachment of the bracket 130 relative to the vertical member 120 is shown in FIGS. 5 and 6 and the bottom two diagrams in FIG. 9. The right-angle attachment of the bracket 130 relative to the vertical member 120 is shown in FIGS. 7 and 8 and the top two diagrams in FIG. 9.

FIG. 5 is a diagram 500 illustrating the tab members 135 of the configurable bracket 130 to attach the bracket to the vertical member 120 of the stand 125 for a display 200 in a high portrait orientation, according to an example embodiment. Vertical member 120 includes manufactured slots 122, which tabs 135 slide of bracket 130 slide into to configure bracket 130 for holding a display 200 in a high portrait orientation.

Tabs 134 are inserted into slots 122 to configure bracket 130 for holding a display 100 in a low portrait orientation. Bracket 130 can also be rotated 90 degrees relative to vertical member 120 and tabs 132 and 133 inserted into slots 122 for holding a display in high or low landscape orientation. Plungers 131 pull out and include a protective rubber tip for inserting edges a display 200 and/or for inserting a back surface of display 200 against bracket 130. When the plungers 131 are released, they push into the sides/back surface of display 200 and hold display 200 firmly against bracket 130.

FIG. 6 is a diagram 600 illustrating the tab members of the configurable bracket 130 to attach the bracket 130 to the stand 125 for a display 200 in a low portrait orientation, according to an example embodiment. Tabs 134 are inserted into slots 122 with tabs 135 beneath tabs 134. Tabs 135 fit through other slots 122 such that the bottom of tabs 134 rest on top of vertical member 120 in top slots 122. This lowers bracket 130 below a vertical height of bracket 130 from that which was shown in FIG. 5 for the high portrait orientation. In the high portrait orientation as sown in FIG. 5 tabs 134 are above tabs 135 which rest on a top of vertical member 120 elevating bracket 130 to a higher vertical position that what is shown in FIG. 6.

FIG. 7 is a diagram 700 illustrating the attachment tab members of the configurable bracket 130 to attach the bracket 130 to the stand 125 for a display 200 in a low landscape orientation, according to an example embodiment. Bracket 130 is rotated 90 degrees counter clockwise relative to vertical member 120. Tabs 133 are inserted into top slots 122 of vertical member 120 to configure a low landscape orientation for any subsequently attached display 200.

FIG. 8 is a diagram 800 illustrating the tab members of the configurable bracket 130 to attach the bracket 130 to the stand 125 for a display 200 in a high portrait orientation, according to an example embodiment. Once again bracket 130 is rotated 90 degrees counter clockwise relative to vertical member 120. Tabs 132 are inserted into top slots 122 of vertical member 120 and rests on top of vertical member 120. Notice tabs 133 sit vertically above tabs 132 and are not inserted into any tabs in vertical member 120 this provides a higher vertical position for bracket 130 relative to the vertical member 120 that what was shown in FIG. 7 for the low landscape orientation. When tabs 132 are inserted into top slots 122 of vertical member 120 any subsequently attached display 200 is in a high landscape orientation.

Figure 9:
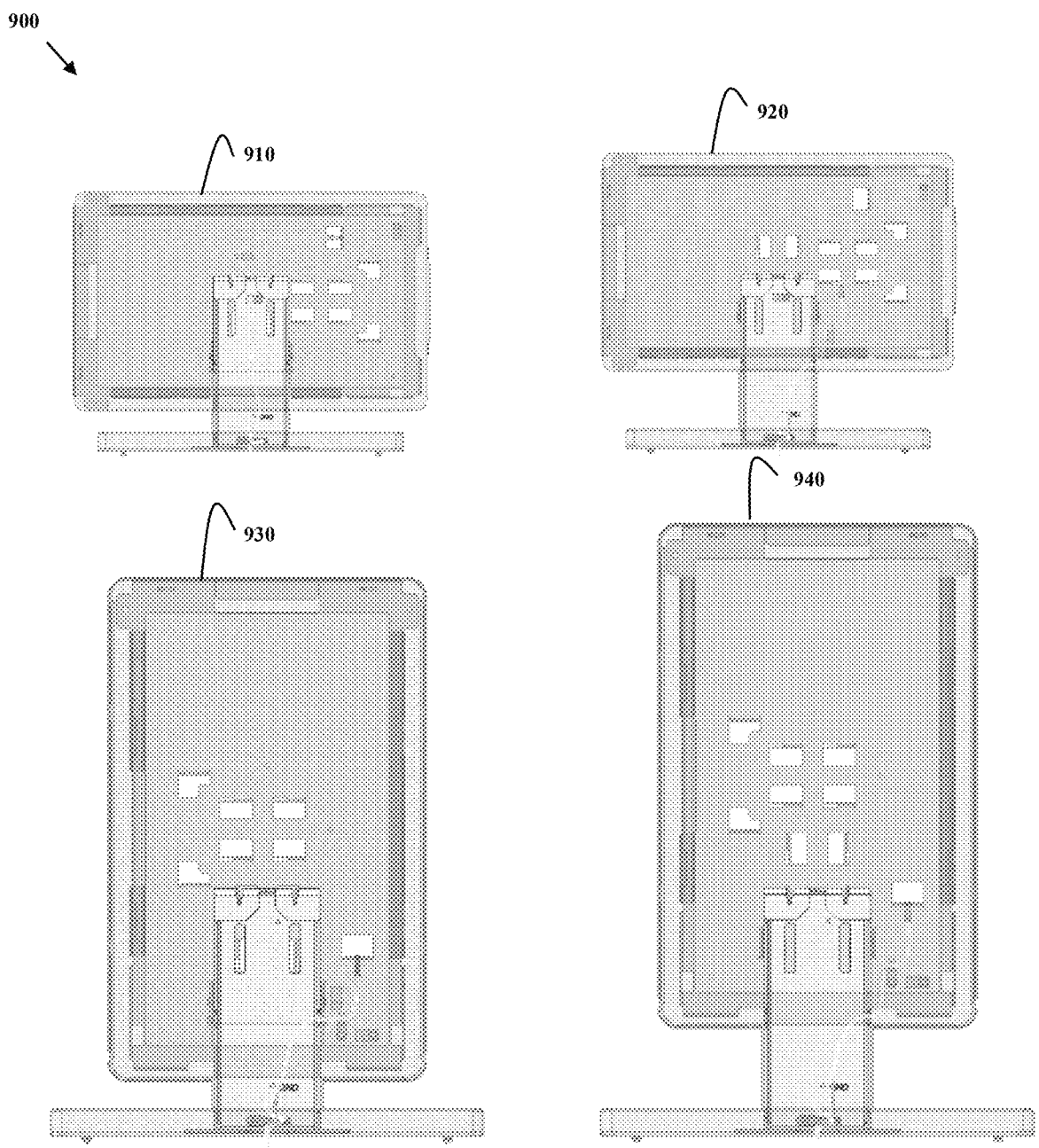
FIG. 9 are diagrams illustrating the bracket attached to the stand for four different display orientations, according to an example embodiment.

FIG. 9 are diagrams 800 illustrating the bracket 130 attached to the stand 125 on vertical member 120 for four different display orientations, according to an example embodiment. The top rightmost figure shows a low landscape orientation of display apparatus 160 and is configured in the manner discussed above with FIG. 7. The top leftmost figure shows a high landscaper orientation of display apparatus 160 and is configured in the manner discussed above with FIG. 8. The bottom rightmost figure shows a low portrait orientation of display apparatus 160 and is configured in the manner discussed above with FIG. 6. The bottom leftmost figure shows a high portrait orientation of display apparatus 160 and is configured in the manner discussed above with FIG. 5.

Figure 10:
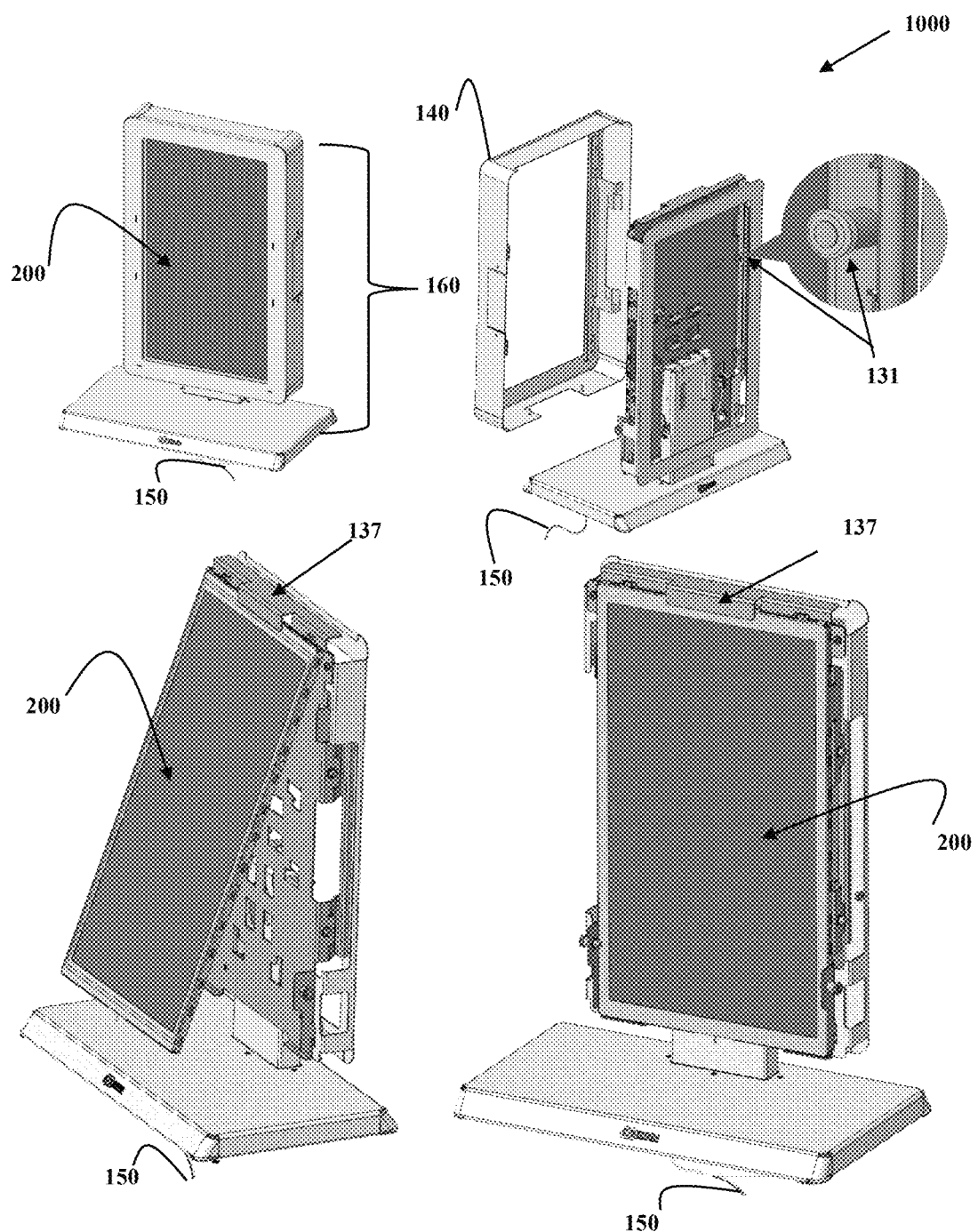
FIG. 10 are diagrams illustrating different sized displays held by the display holding apparatus, according to an example embodiment.

FIG. 10 are diagrams 1000 illustrating different sized displays 200 held by the display holding apparatus 160, according to an example embodiment. An optional display bezel or cover 140 is shown that fits around a periphery of the display 200 attached to bracket 130 of display apparatus 160. Diagrams 1000 also illustrate a top tab 137 of bracket 130 under which the display 200 is tucked under. Plungers 131 are pulled out and released causing plungers 131 to push against and hold the sides of display 200 against bracket 130. Cover 140 can optionally be placed around the periphery of the display 200. The diagrams 1000 of FIG. 10 illustrate the display apparatus 160 configured in a back and low portrait orientation.

A desired display 200 is attached to display holding apparatus 160 with a power and/or power and data cord 150 from lights, light emitting diodes (LEDs) board, and/or data port of display 200 running underneath and through base 110 of display holding apparatus 160. This allows the power or combined power and data wire 150 to be connected accordingly to the terminal without any visible cord 150 when a bottom side of base 110 is mounted to a top side surface of the terminal.

It is noted that for each of the four discussed display apparatus orientations. The display apparatus 160 can also be in a front orientation (i.e. front edge of stand 120 is closer to the front edge of the terminal) as shown in FIG. 2 or display apparatus 160 can be back orientation (e.g., front edge of stand 120 is father from the front edge of the terminal) as shown in FIG. 1. Thus, there are 8 possible configurations achievable with display apparatus 160 via just three components for base 110, stand 120, and bracket 130 or via four components for optional display cover 140.

In an embodiment, four of the six screw holes 111, 112, and 113 in base 110 are manufactured to align with existing screw receptacles (4) in a top surface of a transaction terminal. Screw holes 112 align with at least two of the four existing screw receptacles and whatever orientation front or back selected by a customer for the display holding apparatus 160 ensures that at least two of screw holes 111 or two of screw holes 113 align with the remaining two existing screw receptacles. Thus, apparatus 160 can be used to replace an existing topper of a terminal with just 3 screws and a desired configuration of eight potential configures setup without any screws or any tools being required.

In an embodiment, the display holding apparatus 120 includes an LED board and a panel that sits in front of the LED board to form a display 200 through control of the LEDs on the board illuminated through the panel. In an embodiment, display holding apparatus is sized to hold a tablet touch computer display 200.

In an embodiment, bracket 130 is resizable to hold different sized displays 200. For example a central rail running horizontally across the bracket 130 and a central rail or pair of side rails running vertically across the bracket can be expand out to increase the size of the bracket horizontally and vertically or fold/tuck in to decrease the size of the bracket horizontally and vertically. In this way, display holding apparatus 160 can be custom sized to accommodate different sized displays 200.

Figure 11:
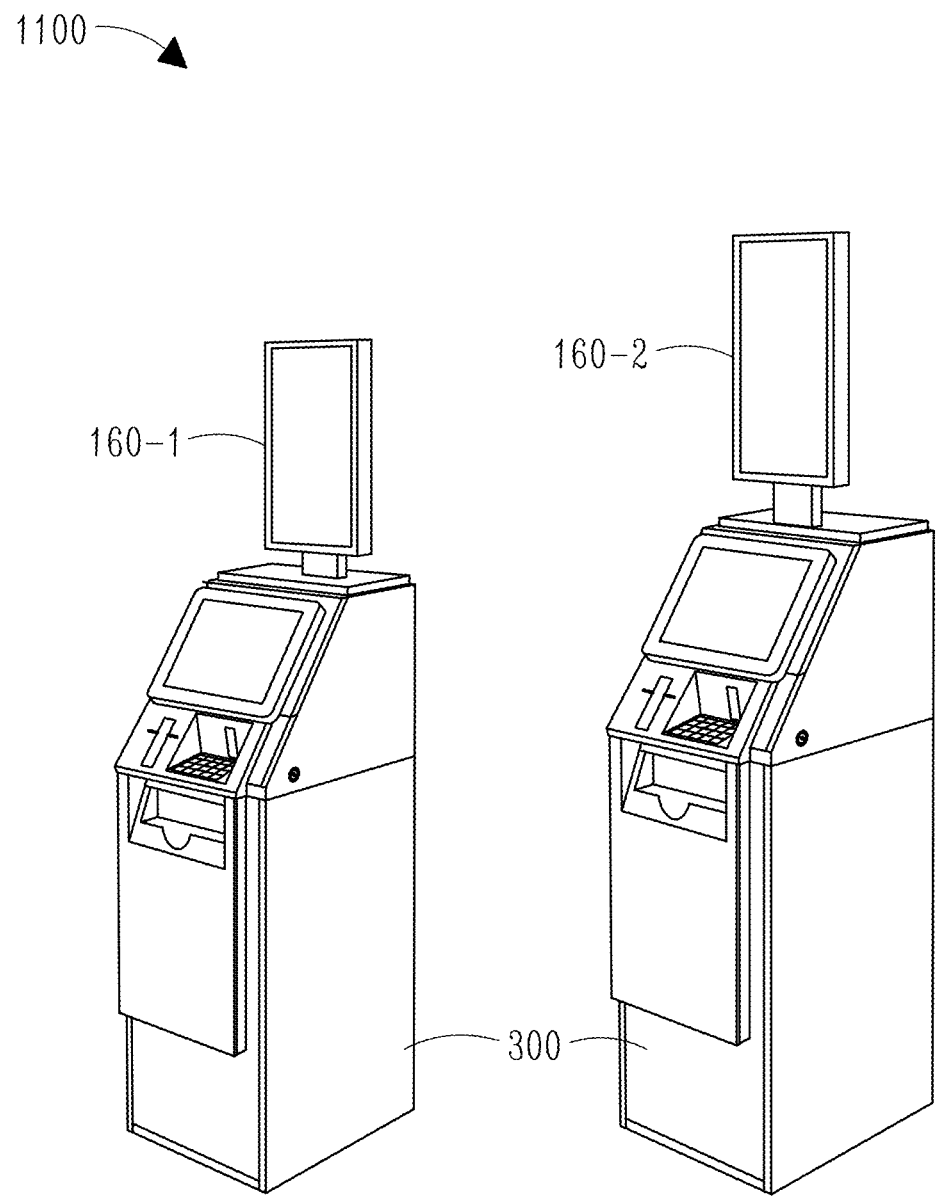
FIG. 11 are diagrams of transaction terminals with displays held by the display holding apparatus, according to an example embodiment.

FIG. 11 are diagrams 1100 of transaction terminals 300 with displays held by the display holding apparatus 160, according to an example embodiment. The leftmost figure shows the display apparatus 160-1 configured in a low portrait orientation for the display 200 and a back orientation for stand 120. The rightmost figure shows the display apparatus 160-2 configured in a high portrait orientation for the display 200 and a front orientation for stand 120. Although not shown, there can also be a low portrait orientation in a front orientation for the stand and a high portrait orientation in a back orientation from stand 120.

Figure 12:
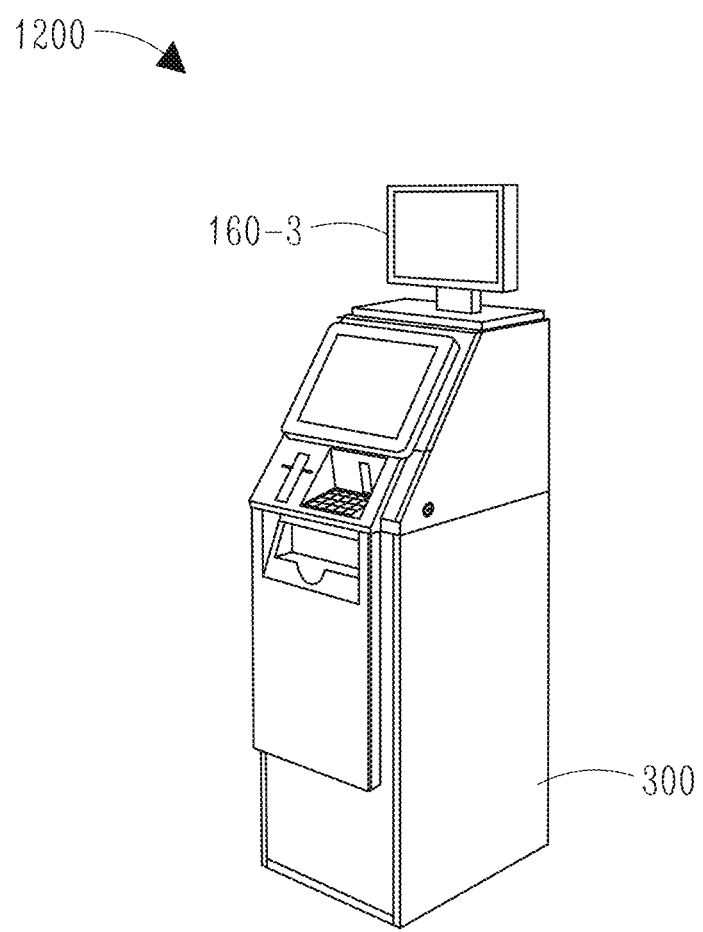
FIG. 12 is another diagram of a transaction terminal with a display held by the display holding apparatus, according to an example embodiment.

FIG. 12 is another diagram 1200 of a transaction terminal 300 with a display 200 held by the display holding apparatus 160, according to an example embodiment. The display 200 is in a high landscape orientation and a back orientation for the stand 120 on top of terminal 300. Although not shown, there can also be a high landscape orientation for display 200 in a front orientation for the stand 120, a low landscape orientation for display 200 in a front orientation for the stand 120, and a low landscape orientation for display 200 in a back orientation for the stand 120.

Again, there can be any of four different display orientations and each of the four can also be in either a font orientation for the stand 120 or a back orientation for the stand 120. Thus, there are eight different configurations achievable with display apparatus 160.

Figure 13:
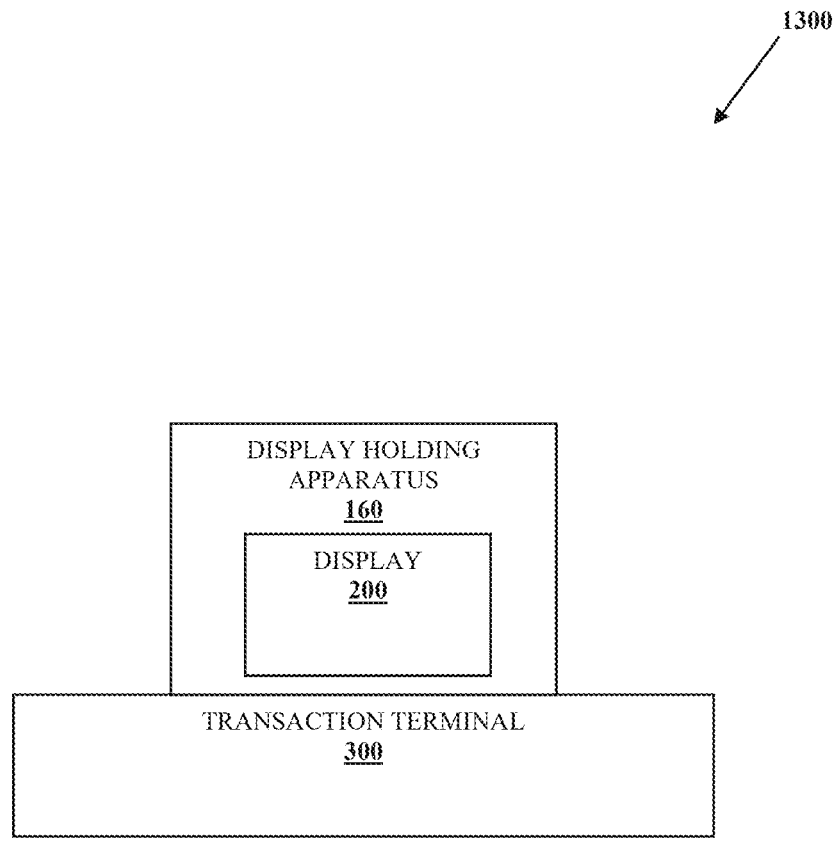
FIG. 13 is a block diagram of a system that includes the display holding apparatus, according to an example embodiment.

FIG. 13 is a block diagram of a system 1300 that includes the display holding apparatus 160, according to an example embodiment. It is noted that system 1300 is shown in greatly simplified form with only those components necessary for understanding the embodiments provided. Thus, there can be more or less components without departing from the teachings provided herein.

System 1300 includes a transaction terminal 300, display holding apparatus 160, and display 200. The display holding apparatus 160 includes a base 110, a vertical member 120, and a bracket 130. In an embodiment, display holding apparatus 160 includes a display cover 140. In an embodiment, display holding apparatus 160 includes an LED light board and a light panel. In an embodiment, the display 200 is a lighted sign with lights and one or more covers/panels, a monitor, a touch monitor, or a tablet.

The vertical member 120 is attachable to base 110 in a front orientation or a back orientation. The bracket 130 is attachable to the vertical member 120 in a high landscape orientation, a low landscape orientation, a high portrait orientation, or a low portrait orientation. Thus, display holding apparatus 160 can be configured in 8 different configurations.

In an embodiment, the apparatus 160 when holding a specific display 200 forms a display system.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A display holding apparatus, comprising:
   a base;
   a vertical member attachable and detachable to the base in first orientations;
   a stand comprising the vertical member attached to the base in a certain first orientation; and
   a bracket attachable and detachable to the vertical member of the stand along a first side of the bracket in second orientations, wherein the bracket, along a second side, is adapted to hold a display in a certain second orientation;
   wherein first orientations comprise a front orientation and a back orientation, wherein the front orientation includes the vertical member being attached closer to a front edge of the base than that which is associated with the back orientation;
   wherein the base includes three pairs of screw holes, a first pair of screw holes associated with the front orientation, a second pair of screw holes associated with the back orientation, and a third pair of screw holes associated with both the front orientation and the back orientation.

2. The display holding apparatus of claim 1 further comprising, a display cover adapted to fit over a periphery of the display and snap onto a portion of the bracket.

3. The display holding apparatus of claim 1, wherein the base comprises an aperture adapted to allow at least one cord associated with the display to pass through the aperture to one or more of a power supply and a device.

4. The display holding apparatus of claim 1, wherein the second orientations includes a first height landscape orientation for any attached display, a second height landscape orientation that is higher than the first height landscape orientation, a first height portrait orientation for any attached display, and a second height portrait orientation that his higher than the first height portrait orientation.

5. The display holding apparatus of claim 1, wherein the vertical member of the stand includes slots.

6. The display holding apparatus of claim 5, wherein the first side of the bracket includes a plurality of tabs.

7. The display holding apparatus of claim 6, wherein a given pair of the plurality of tabs are configured to be inserted into the slots to form a given second orientation.

8. The display holding apparatus of claim 7, wherein at least one pair of the plurality of tabs align for insertion into the slots when the bracket is rotated 90 degrees from an original vertical orientation of the bracket.

* * * * *